Nov. 4, 1958   K. D. ASHLEY ET AL   2,859,183
PROCESS OF PREPARING ALUMINA SOLS FROM ALUMINUM PELLETS
Filed June 3, 1955   2 Sheets-Sheet 1
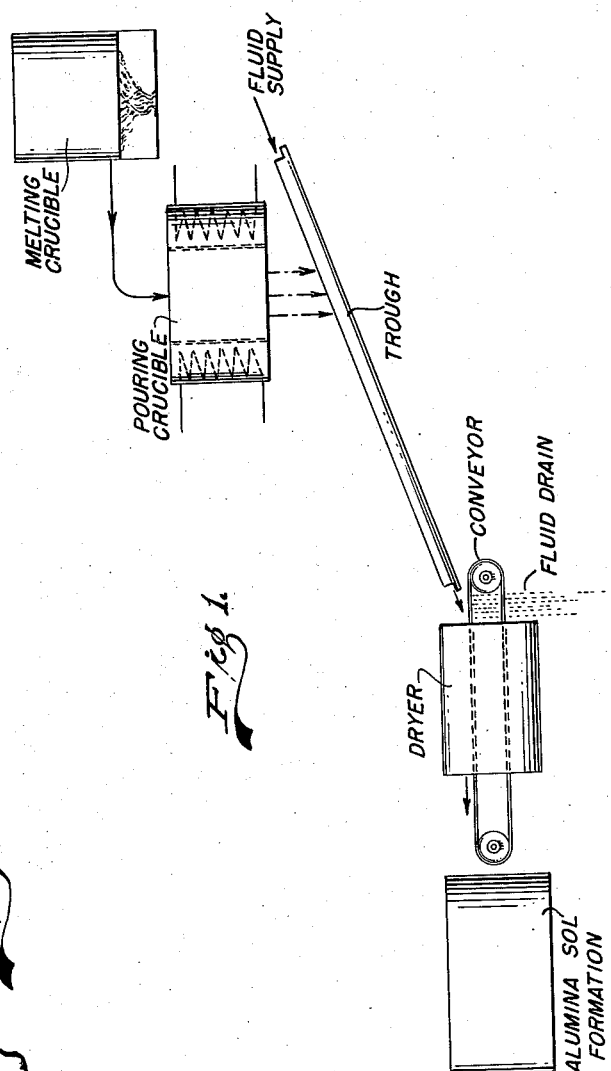
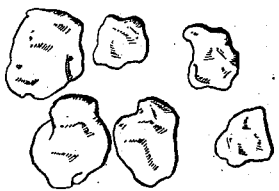
INVENTORS.
KENNETH D. ASHLEY,
GORGO J. BRUNI
BY
Alexander T. Kardos
ATTORNEY.

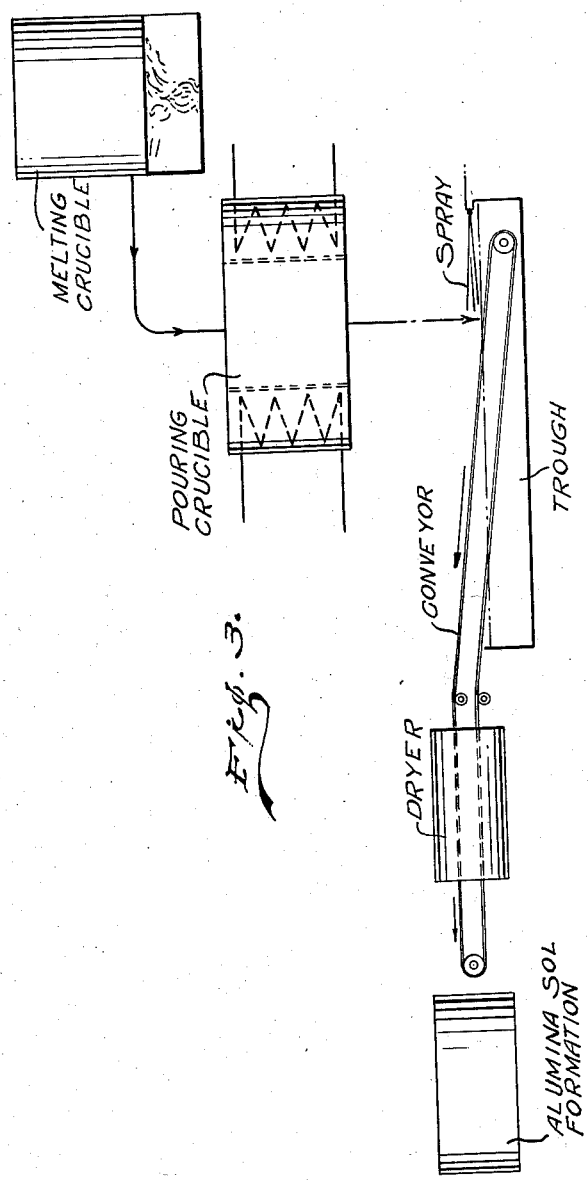

2,859,183
PROCESS OF PREPARING ALUMINA SOLS FROM ALUMINUM PELLETS

Kenneth D. Ashley and Gorgo J. Bruni, Stamford, Conn., assignors to American Cyanamid Company, New York, N. Y., a corporation of Maine Application June 3, 1955, Serial No. 513,038

8 Claims. (Cl. 252—313)

The present invention relates to improved methods of preparing alumina sols from metallic aluminum and more particularly relates to improved methods of preparing alumina sols of high $Al_2O_3$ solids content and of low viscosity from specially prepared, preformed metallic aluminum pellets.

In United States Patents 2,274,634 and 2,345,600, there are described processes of preparing alumina sols from metallic alumina by amalgamating the aluminum with a small quantity of a mercury compound and then converting the same to an alumina sol by the action of water, slightly acidulated by the addition of low percentages (1-5%) of a lower aliphatic acid such as acetic acid, formic acid or tartaric acid. In United States Patent 2,258,099, somewhat related processes of preparing aluminum oxide sols are disclosed and, in general, the techniques disclosed therein fall within the same generic class as those previously described.

Other processes of preparing alumina sols from metallic aluminum such as the prolonged heating and digesting of relatively pure metallic aluminum in aqueous aluminum chloride solutions at elevated temperatures are also applicable within the broader concepts of the present invention.

In these patented processes, metallic aluminum of high degree of purity is employed and is converted to the alumina sol form which contains up to about 5% $Al_2O_3$ by solids. Efforts to increase such solids content and thus reduce the enormous quantities of water to be handled with such sols have failed inasmuch as they resulted in the gelling or solidifying of the sol, or at least in its becoming so viscous that handling and pumping or other manipulating thereof became impossible.

It is therefore a principal purpose of the present invention to provide methods of preparing alumina sols in relatively short periods of time which will contain high $Al_2O_3$ solids content and low viscosities whereby the quantities of water to be handled will be reduced without increasing the handling or pumping problems.

It has been found that, if the metallic aluminum is specially prepared and preformed by the improved methods to be described hereinafter, it surprisingly permits such purposes to be attained by the use of the processes generally referred to hereinbefore. These improved methods comprise the formation and use of preformed flattened aluminum pellets which have been prepared by pouring molten aluminum at a controlled temperature and under a specified hydrostatic head through a circular hole or opening of a critical size and letting the stream of molten aluminum strike or impinge a rapidly flowing fluid stream, such as a water spray, or a layer of water flowing on a surface, preferably the flat bottom of a trough, whereby the special flattened form is created. The rapidly flowing cooling fluid stream quickly breaks up the downwardly falling molten metal stream into small drops which flatten into pellets. The stream then carries the formed pellets away from the line of downward flight or impact area and the pellets may then be collected, dried or treated further, as desired or required.

Among the advantages of such an improved method is the very high purity of the resulting product which will normally possess a purity on the order of about 99.99% aluminum. Such a method is to be contrasted to prior methods, such as the process of pouring the molten aluminum metal over a screen and allowing it to fall into water, in which considerable contamination resulted reducing the purity of the resulting product to undesirable values.

This procedure is shown schematically in the drawings wherein Figure 1 is a flow chart showing the process using a rapidly flowing layer of water, Figure 2 illustrates generally the shape of the aluminum pellets, and Figure 3 is a flow chart showing the process using a water spray.

The aluminum metal is of a very high degree of purity and preferably is on the order of about 99.99% pure aluminum. Lower percentages, down to about 99.6% pure aluminum, may be used but it is to be appreciated that such use introduces greater amounts of impurities and, although satisfactory in many instances, does not yield the optimum properties and characteristics desired in the resulting product.

As shown in Figures 1 and 3 of the drawings, the aluminum is preferably melted down in a silicon carbide melting crucible (to minimize contamination) which may be heated in any desired manner (such as a gas-fired or electric furnace) and, then, when in a molten condition, may be transferred to a separate pouring or pelletizing crucible. This pouring crucible is also heated in any desired manner and the heating is so controlled as to maintain the molten aluminum at a temperature of from about 1228 to about 1500° F., and preferably from about 1250 to about 1300° F. Temperatures lower than that range have been found to be unsatisfactory inasmuch as the fluidity of molten mass undesirably decreases sharply below 1230° F. Temperatures above the indicated range (above 1500° F.) are also unsatisfactory inasmuch as irregularly shaped aluminum pellets are obtained whereby the advantages and benefits of the present invention are lost.

Circular holes or openings are provided in the bottom of the pouring crucible and the molten aluminum is permitted to pour naturally therethrough. The size of these openings is critical and it has been found that holes having a diameter of from about 3/64 to about 17/64 of an inch, and preferably 5/64–8/64 inch, are required for proper pellet formation. Openings which do not fall within the indicated range either plug quickly and become inoperative or create a stream of molten aluminum not capable of providing the proper pellet characteristics.

The amount of molten aluminum above the hole in the crucible directly affects the force with which the molten aluminum stream leaves the crucible as well as the rate and quantity of flow of aluminum from the crucible. It has been found that a "hydrostatic head" obtained by having from about 2 to about 10 inches, and preferably from about 3 to about 9 inches, of molten aluminum (measured vertically) above the opening results in proper aluminum pellet formation. The rate of flow of aluminum under such circumstances will vary from about 80 to about 120 pounds of aluminum per hour per hole, depending upon the size of the hole and the average height of the molten aluminum.

The molten aluminum issuing from the opening in the crucible drops downwardly and freely strikes a spray of water or an inclined surface over which a rapidly-flowing cooling fluid stream is passing. This stream is preferably a thin layer or sheet of water of up to about 1/8 inch in thickness or depth which quickly breaks up the falling molten metal stream into small individual drops. These drops flatten out and are cooled and carried onwardly and downwardly along the inclined bottom surface by the fluid stream away from the line of fall rapidly enough to prevent any piling up of pieces of aluminum. The angle at which the inclined bottom surface is maintained may be varied within wide limits but it has been found that from about 20° to about 25°, and preferably 23°, below the horizontal provides for acceptable pellet formation and pellet handling. The distance of free-fall should be small, a matter of inches only, say, less than 6–8 inches, so that the molten aluminum does not change materially in temperature or solidify before it hits the flowing stream and the inclined surface.

The fluid layer or sheet is preferably water and may be supplied by water issuing from tubes, slits or similar orifices. The pressure and rate of flow of the water should be such that the layer of water have a thickness of from about 1/16 inch to about 3/16 inch and preferably about 1/8 inch and is normally in the range of from about 5 pounds per square inch to about 30 pounds per square inch for a 1/2 inch tube.

In the event that a water spray is employed, as shown in Figure 3, the pressure and quantity thereof should be sufficient to quickly break up the downwardly-falling molten aluminum stream into individual droplets and carry them away from the line of downward flight in the form of flattened aluminum pellets. A spray such as derived from 1/4 to 1/2 inch pipe, either circular in cross-section or preferably partially flattened or elliptical to spread out the spray, with the pipe being under a pressure of from about 6 to 16 pounds per square inch has been found satisfactory to prevent piling-up of flattened pellets.

The pellets may then be heated and dried to remove water and/or otherwise processed prior to actual usage in the alumina sol formation. These pellets are hollow for the most part and present at least three times as much surface areas for reaction purposes as do solid spherical pellets. They range in average weight from about 0.4 to about 1.0 gram, have a bulk density of from about 35 to about 70 pounds per cubic foot and have only a trace (less than about 1%) through a 6 plate per inch parallel plate grid screen, having approximately 0.13 inch openings between plates. For the most part, they are irregularly round, as shown in Fig. 2 of the drawing, having a diameter of from about 0.3 to about 0.7 inch and are somewhat flattened, having a thickness of from 0.2 to about 0.1 inch, with the greater diameter pellets normally having the lesser thickness.

These pellets may then be employed in the sol formation procedures as described hereinabove and the desired results of low reaction times, high $Al_2O_3$ contents and low viscosity may be realized.

The invention will be further illustrated in more specific detail by the following examples. It should be understood, however, that although these examples may describe in more particular detail some of the very specific features of the invention, they are given primarily for purposes of illustration and the invention in its broader aspects is not to be construed as limited thereto.

*Example 1 (aluminum chips or turnings)*

The sol formation procedures described herein were carried out using chips obtained by comminuting aluminum ingots in a vertical miller or shaper with tungsten carbide cutters. The metal was cut or turned from the ingot in a thin cut which curled, compressed and broke into individual curved chips approximately averaging 5/8 inch in length and 3/8 inch in width. Considerable heat was generated during such chip cutting and large quantities of aluminum oxide were formed.

140 pounds of these aluminum chips were reacted at approximately 155° F. with 49 pounds of acetic acid making a 1.8% aqueous acetic acid solution in the presence of about 3.9 pounds of mercuric oxide. The chips reacted very rapidly with considerable foaming, causing difficult control problems. In some cases, the chips entered the foam layer and produced gel particles therein. Such a reaction, in less than 24 hours, produced a viscous material (1.6 centipoises at 60° C.) which, although it contained sufficient $Al_2O_3$ (approximately 7% by solids), was too viscous to handle and was commercially unsatisfactory.

*Example 2 (aluminum sheets)*

The sol formation procedures described herein were carried out rising "Alcoa 2S–O" aluminum rolled sheets, 0.025" thickness, 99.4% aluminum minimum, 0.2% copper maximum, cut into sizes capable of easily fitting within the reactor.

100 pounds of such cut aluminum sheets were reacted with acetic acid (0.92 mole acid per mol $Al_2O_3$) and water to make up a 2% aqueous acetic acid concentration at a temperature of 151–167° F. 5 pounds of mercuric oxide were added at the outset. Considerable foaming was encountered. The reaction was carried out in an enamel-lined vessel for 45 hours and a maximum $Al_2O_3$ content of 4.5% by solids was obtained. Such a sol was not too viscous to handle but, due to the low $Al_2O_3$ content, necessitated the handling of large volumes of water and left much to be desired from an economical standpoint. From an overall standpoint, this method was not satisfactory. Additionally, the sheets tended to pile up in stacks during the reaction and occasionally struck the agitator.

*Example 3 (aluminum sheets)*

The procedures of Example 2 were followed substantially as set forth therein with aluminum sheets but with the following changes: The reaction temperature was increased to 158–176° F. and the concentration of the acetic acid was increased to 1.38 mols of acid per mol $Al_2O_3$. Excessive foaming was encountered and the reaction was difficult to control. The $Al_2O_3$ content at the end of 43 hours was still only 4.5% by solids. Efforts to obtain higher alumina concentrations without introducing viscosity problems were unsuccessful. This method was also deemed unsatisfactory.

*Example 4 (granulated aluminum)*

The sol formation procedures described herein were carried out using Alcoa granulated ingot, 1/8" to 3/8" diameter, flattened spheres, 99.6% aluminum minimum and 0.02% copper maximum.

Using conditions similar to those set forth in the preceding examples, alumina sols containing up to a maximum 4.2–4.6% concentrations were obtained in relatively short periods of times due to rapid reaction rates with considerable foaming and control problems. Efforts to obtain more concentrated sols without introducing viscosity problems were not successful.

*Example 5 (grained aluminum)*

The sol formation procedures described herein were carried out using aluminum pellets formed by the trough 99.4% aluminum minimum.

Using conditions similar to those set forth in the preceding examples, the reactions were very rapid with excessive foaming, causing difficult control problems. Reduced temperatures, down to 140° F., however, slowed the reaction down and decreased the foaming but caused increased over-all reaction time. Some of the finer particles of aluminum were thrown up into the foam layer and formed small gel particles to increase the viscosity difficulties. The sols ultimately obtained averaged 4.5% alumina and could be handled satisfactorily. Efforts to obtain higher solids content merely led to thickening or gelling up of the reaction mixture. This method was not satisfactory.

*Example 6 (trough process aluminum)*

The sol formation procedures described herein were carried out using aluminum pellets formed by the trough process of the present invention. The particular batch of pellets employed were made using 3/32" openings in the pelletizing crucible, keeping a hydrostatic head of 2-10 inches of molten aluminum and a rate of flow of 80-90 pounds of aluminum per opening. The pellets had an average weight of 0.5 gram, a bulk density of 0.75 gram per cc. and less than 1% trough, a parallel plate grid per screen having 6 plates per inch and openings of about 0.13 inch.

120 pounds of trough pellets were reacted 49.6 pounds of acetic acid, 4.5 pounds of mercuric oxide and water to bring the acetic acid concentration to approximately 2.10% at the start (decreasing to 1.86% final concentration). The viscosity after 8 hours was only 0.65 centipoise (60° C.) and at 20 hours it had reached only 0.97 centipoise. The resulting alumina sol contained a high concentration of $Al_2O_3$ (6.89% by solids) and could be easily handled due to its low viscosity.

*Example 7 (spray process aluminum)*

The procedures set forth in Example 6 were carried out using the water spray technique. 3/8" circular pipe (partially flattened to form an oval slit) was used with a water pressure of approximately (a) 16 pounds per square inch and (b) 11 pounds per square inch.

In (a) the bulk density was determined to be from 0.9 to 1.0 gram/cc. and the particle size was rather fine. In (b) the bulk density was 0.5-0.7 gram per cc. and the particle size was not as fine as that of (a). The preparation of sols from these pellets was substantially as set forth in Example 6 with some foaming (controllable) due to relative fineness of the particles.

*Example 8*

Aluminum ingots of approximately 99.99% purity were melted in a silicon carbide crucible having a capacity of 500 lbs. of metal. When the temperature of the aluminum reached 1250-1300° F., it was poured into another heated pouring crucible having a capacity of 100 lbs. of metal. The latter crucible had two fused alumina nozzles having diameters of 3/32 inch each inserted through the bottom. The molten aluminum was maintained at a hydrostatic head of about 3-9 inches and flowed through the holes in the nozzle and fell into an inclined U-shaped metal trough preferably made of stainless steel. The trough was approximately 4" wide and about 36" long. Water at 5 p. s. i. from two 1/2 inch tubes entered at one end of the trough. The streams were adjusted so that the bottom of the trough was completely covered with a thin sheet or layer of fluid having a depth of about 1/8 inch. The trough was inclined at an angle of 23-25° with the horizontal so that the water and pellets could rapidly and easily flow out of the trough. The material leaving the trough fell into a vibrating conveyor, the bottom of which was water tight. The feed end of the conveyor was slightly lower than the discharge end so that there was about 1 1/2 inch of liquid on the conveyor at the point where the trough discharged into it. There was a screen at the discharge end of the conveyor to enable the water to drain from the pellets.

The aluminum stream on hitting the water was broken up into particles averaging from 0.5 to 0.6 g. each and the velocity of the water on the trough was sufficient to keep the particles of aluminum separated, but on the conveyor the motion was so turbulent that most of the particles of aluminum would touch each other at one time or another. The particles were observed to solidify on the trough since no agglomeration was observed on the conveyor.

The pellets leaving the conveyor contained about 10 percent water. They were mostly irregularly round and flat with a bulk density of 45 to 55 lb. per cu. ft. The pellets were formed at a rate of 80 to 90 lb./hr./hole. They passed through a belt drier to remove the water.

1000 gallons of demineralized water was run into a 2000 gallon reactor and heated to a temperature of about 120-135° F. The agitator in the reactor was started and 300 lbs. of aluminum pellets was then added plus 100 lbs. and 80 lbs. of aluminum pellets at 5 hours and 10 hours. 21.1 gallons (188 lbs.) of 85% acetic acid was then added and additions were made of 3.2 gallons (29 lbs.) at 7 hours and 14 hrs. whereby a percentage concentration of about 1.8 to about 2% of free acetic acid was maintained throughout the reaction.

The reaction mixture was heated at a temperature of about 75.5° C. (168° F.) to about 79.5° C. (175° F.) or even higher if the foaming of the reaction was not too great. 9 lbs. of mercuric oxide was added at the start of the reaction and an additional 9 lbs., 3 lbs. and 3 lbs. were added after reaction times of 1 hr., 5 hrs., and 10 hrs.

The height of the foam was checked every half hour and samples were withdrawn every 2 hrs. and tested for $Al_2O_3$, acetic acid concentrations and viscosity. The $Al_2O_3$ concentration increased at a rate of about 0.31-0.45% per hour and reached a solids content of the sol of 7.0%, at which time the viscosity was only 0.95 centipoise (60° C.). The reactor was then emptied and the contents thereof were discharged onto a vibratory screen to separate the unreacted metallic aluminum and other solid materials from the raw sol.

*Example 9*

Aluminum ingots of approximately 99.99% purity were melted in a silicon carbide crucible having a capacity of 500 lbs. of metal. When the temperature of the aluminum reached 1290° F., it was poured into another heated pouring crucible having a capacity of 100 lbs. of metal. The latter crucible had two fused alumina nozzles having diameters of 7/64 inch each inserted through the bottom. The molten aluminum was maintained at a hydrostatic head of from about 2 to about 10 inches and flowed through the holes in the nozzle and fell into an inclined U-shaped metal trough preferably made of stainless steel. The trough was approximately 4" wide and about 36" long. Water at 25 p. s. i. from two 1/2 inch tubes entered at one end of the trough. The streams were adjusted so that the bottom of the trough was completely covered with a thin sheet or layer of fluid having a depth of about 1/8 inch. The trough was inclined at an angle of 25° with the horizontal so that the water and pellets could rapidly and easily flow out of the trough. The material leaving the trough fell into a vibrating conveyor, the bottom of which was water tight. The feed end of the conveyor was slightly lower than the discharge end so that there was about 1 1/2 inch of liquid on the conveyor at the point where the trough discharged into it. There was a screen at the discharge end of the conveyor to enable the water to drain from the pellets.

The aluminum stream on hitting the water was broken up into particles averaging from 0.5 to 0.8 g. each and the velocity of the water on the trough was sufficient to keep the particles of aluminum separated, but on the conveyor the motion was so turbulent that most of the particles of aluminum would touch each other at one time or another. The particles were observed to solidify on the trough since no agglomeration was observed on the conveyor.

The pellets leaving the conveyor contained about 10 percent water. They were mostly irregularly round and flat with a bulk density of 35 to 55 lb. per cu. ft. The pellets were formed at a rate of 90 to 100 lb./hr./hole. They passed through a belt drier to remove the water.

1000 gallons of deionized water was run into a 2000 gallon reactor and heated to a temperature of about 125° F. The agitator in the reactor was started and 180 lbs. of aluminum pellets and 100 lbs. of recycled aluminum pellets was then added. 21.1 gallons (188 lbs.) of 85% acetic acid was then added and additions were made of 3.2 gallons (29 lbs.) at 7 hours and 14 hours whereby a percentage concentration of about 1.8 to about 2% acetic acid was maintained throughout the reaction. 100 lbs. of aluminum pellets were added at 5 and 10 hours.

The reaction mixture was heated at a temperature of about 77° C. (171° F.) to about 82° C. (180° F.) or even higher if the foaming of the reaction was not too great. No mercuric oxide was added at the start of the reaction. 2.75 lbs. was added after a reaction time of 1 hour.

The height of the foam was checked every half hour and samples were withdrawn every 2 hours and tested for $Al_2O_3$, acetic acid concentration and viscosity. The $Al_2O_3$ concentration increased at a rate of about 0.31–0.45% per hour and reached a pellets content of the sol of 7.6%, at which time the viscosity was only 1.05 centipoises (60° C.). The reactor was then emptied and the contents thereof were discharged onto a vibratory screen to separate the unreacted metallic aluminum and other solid materals from the raw sol.

Example 10

Aluminum ingots of approximately 99.99% purity were melted in a silicon carbide crucible having a capacity of 500 lbs. of metal. When the temperature of the aluminum reached 1270° F., it was poured into another heated pouring crucible having a capacity of 100 lbs. of metal. The latter crucible had three fused alumina nozzles having diameters of 5/64 inch each inserted through the bottom. The molten aluminum was maintained at a hydrostatic head of about 3–8 inches and flowed through the holes in the nozzle and fell into an inclined U-shaped metal trough preferably made of stainless steel. The trough was approximately 4" wide and about 36" long. Water at 5 p. s. i. from two 1/2 inch tubes entered at one end of the trough. The streams were adjusted so that the bottom of the trough was completely covered with a thin sheet or layer of fluid having a depth of about 1/8 inch. The trough was inclined at an angle of 20° with the horizontal so that the water and pellets could rapidly and easily flow out of the trough. The material leaving the trough fell into a vibrating conveyor, the bottom of which was water tight. The feed end of the conveyor was slightly lower than the discharge end so that there was about 1 1/2 inch of liquid on the conveyor at the point where the trough discharged into it. There was a screen at the discharge end of the conveyor to enable the water to drain from the pellets.

The aluminum stream on hitting the water was broken up into particles averaging from 0.4 to 0.6 g. each and the velocity of the water on the trough was sufficient to keep the particles of aluminum separated, but on the conveyor the motion was so turbulent that most of the particles of aluminum would touch each other at one time or another. The particles were observed to solidify on the trough since no agglomeration was observed on the conveyor.

The pellets leaving the conveyor contained about 10 percent water. They were mostly irregularly round and flat with a bulk density of 45 to 65 lb. per cu. ft. The pellets were formed at a rate of 70 to 80 lb./hr./hole. They passed through a belt drier to remove the water.

1000 gallons of deionized water was run into a 2000 gallon reactor and heated to a temperature of about 132° F. The agitator in the reactor was started and 120 lbs. of aluminum pellets and 160 lbs. of recycled aluminum pellets was then added. 21.1 gallons (188 lbs.) of 85% acetic acid was then added and additions were made of 3.2 gallons (29 lbs.) at 7 hours and 14 hours whereby a percentage concentration of about 1.8 to about 2% acetic acid was maintained throughout the reaction. Additions of 100 lbs. each of aluminum pellets were made at 5 and 10 hours.

The reaction mixture was heated at a temperature of about 74° C. (167° F.) to about 80° C. (176° F.) or even higher if the foaming of the reaction was not too great. No mercuric oxide was added at the start of the reaction but 2.75 lbs. was added after a reaction time of 1 hour.

The height of the foam was checked every half hour and samples were withdrawn every 2 hours and tested for $Al_2O_3$, acetic acid concentration and viscosity. The $Al_2O_3$ concentration increased at a rate of about 0.31–0.45% per hour and reached a pellets content of the sol of 7.9%, at which time the viscosity was only 1.10 centipoises (60° C.). The reactor was then emptied and the contents thereof were discharged onto a vibratory screen to separate the unreacted metallic aluminum and other solid materials from the raw sol.

Example 11

435 grams of aluminum chloride hexahydrate was dissolved in sufficient deionized water to make up 1350 milliliters of solution. This solution was heated to a temperature of about 200° F. and 325 grams of flattened aluminum pellets (99.99% pure) prepared by the trough process was added thereto with good agitation. The mixture was heated with good agitation at a temperature of from about 200 to about 210° F. under reflux for about 30 hours. No excessive foaming or frothing which could not be controlled was encountered. The height of the foam was periodically checked every half hour to make sure that excessive foaming was not occurring. Samples were withdrawn periodically every hour and were tested for alumina content and viscosity in order to make sure that excessive reaction rates and undue increase in solution viscosity were not taking place.

At the end of the 30 hour reaction time, the density was approximately 1.3 and the pH was about 3. The reaction mixture was then emptied from the reactor and discharged onto a vibratory screen in order to remove excess metallic aluminum particles. The screened material was then centrifuged to remove fine particles of metallic aluminum as well as sludge. The raw alumina sol was then ready for further processing, as desired.

Although we have described specific examples of our inventive concept, we consider the broad aspects of the same not to be limited to the specific substances mentioned therein but to include various other compounds of equivalent function and constitution as set forth in the claims appended hereto. It is understood that any suitable changes, modifications and variations may be made without departing from the spirit and scope of the invention.

We claim:

1. A process of preparing an alumina sol of high $Al_2O_3$ solids content and low viscosity which comprises pouring molten aluminum having a temperature of from about 1228 to about 1500° F. through an opening having a diameter of from about 3/64 to about 17/64 of an inch under a hydrostatic head of from about 2 to about 10 inches, impinging the downwardly falling aluminum against a rapidly flowing fluid stream to break up the same and carry it away from the line of downward flight in the form of individual flattened aluminum pellets, and subjecting the aluminum pellets to the action of a weak aqueous lower aliphatic acid in contact with an amalgamating agent comprising mercury whereby the sol is formed.

2. A process of preparing an alumina sol of high $Al_2O_3$ solids content and low viscosity which comprises pouring molten aluminum having a temperature of from about 1228 to about 1500° F. through an opening having a diameter of from about 3/64 to about 17/64 of an inch under a hydrostatic head of from about 2 to about 10 inches, impinging the downwardly falling aluminum stream against a rapidly flowing water spray to break up the same and carry it away from the line of downward flight in the form of flattened aluminum pellets, and subjecting the aluminum pellets to the action of a weak aqueous lower aliphatic acid in contact with an amalgamating agent comprising mercury whereby the sol is formed.

3. A process of preparing an alumina sol of high $Al_2O_3$ solids content and low viscosity which comprises pouring molten aluminum having a temperature of from about 1228 to about 1500° F. through an opening having a diameter of from about $3/64$ to about $17/64$ of an inch under a hydrostatic head of from about 2 to about 10 inches, impinging the downwardly falling aluminum stream against an inclined surface over which a cooling fluid stream is flowing whereby individual flattened aluminum pellets are formed and subjecting the aluminum pellets to the action of a weak aqueous lower aliphatic acid in contact with an amalgamating agent comprising mercury whereby the sol is formed.

4. A process of preparing an alumina sol of high $Al_2O_3$ solids content and low viscosity which comprises pouring molten aluminum having a temperature of from about 1228 to about 1500° F. through an opening having a diameter of from about $3/64$ to about $17/64$ of an inch under a hydrostatic head of from about 2 to about 10 inches, impinging the downwardly falling aluminum stream against an inclined surface over which a cooling water stream is flowing whereby individual aluminum pellets are formed and subjecting the aluminum pellets to the action of a 1–5% solution of a weak aqueous lower aliphatic acid in contact with an amalgamating agent comprising mercury whereby the sol is formed.

5. A process of preparing an alumina sol of high $Al_2O_3$ solids content and low viscosity which comprises pouring molten aluminum having a temperature of from about 1228 to about 1500° F. through an opening having a diameter of from about $3/64$ to about $17/64$ of an inch under a hydrostatic head of from 2 to about 10 inches, impinging the downwardly falling aluminum stream against an inclined surface over which a cooling water stream is flowing whereby individual aluminum pellets are formed and subjecting the aluminum pellets to the action of a 1–5% aqueous solution of acetic acid in contact with an amalgamating agent comprising mercuric oxide whereby the sol is formed.

6. A process of preparing an alumina sol of high $Al_2O_3$ solids content and low viscosity which comprises pouring molten aluminum having a temperature of from about 1228 to about 1500° F. through an opening having a diameter of from about $3/64$ to about $17/64$ of an inch under a hydrostatic head of from about 2 to about 10 inches, impinging the aluminum against an inclined surface over which a cooling fluid stream is flowing in a sheet having a depth of from about $1/16$ to about $3/16$ inch whereby individual aluminum pellets are formed and subjecting the aluminum pellets to the action of a weak aqueous lower aliphatic acid in contact with an amalgamating agent comprising mercury whereby the sol is formed.

7. A method as defined in claim 6 wherein the temperature of the molten aluminum is from about 1250 to about 1300° F.

8. A method as defined in claim 6 wherein the diameter of the opening is from about $5/64$ to about $8/64$ inch.

References Cited in the file of this patent
UNITED STATES PATENTS

| | | |
|---|---|---|
| 228,481 | Shiver | June 8, 1880 |
| 2,286,078 | Hatchard | June 9, 1942 |
| 2,383,315 | Hyde | Aug. 21, 1945 |
| 2,696,474 | Heard | Dec. 7, 1954 |
| 2,728,107 | Hershey | Dec. 27, 1955 |
| 2,738,548 | Kassel | Mar. 20, 1956 |